US010738832B2

(12) United States Patent
Lee

(10) Patent No.: US 10,738,832 B2
(45) Date of Patent: Aug. 11, 2020

(54) TRIPOD JOINT SPIDER, METHOD OF MANUFACTURING THE SAME, AND ALLOY STEEL APPLIED THERETO

(71) Applicant: Hyundai Motor Company, Seoul (KR)

(72) Inventor: Si Yup Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 701 days.

(21) Appl. No.: 15/216,371

(22) Filed: Jul. 21, 2016

(65) Prior Publication Data

US 2017/0284476 A1   Oct. 5, 2017

(30) Foreign Application Priority Data

Apr. 4, 2016   (KR) .................. 10-2016-0041191

(51) Int. Cl.
| F16D 3/205 | (2006.01) |
| C21D 1/18 | (2006.01) |
| C21D 1/42 | (2006.01) |
| C22C 38/32 | (2006.01) |
| C22C 38/24 | (2006.01) |
| C22C 38/22 | (2006.01) |
| C22C 38/06 | (2006.01) |
| C22C 38/04 | (2006.01) |
| C22C 38/02 | (2006.01) |
| C22C 38/00 | (2006.01) |

(52) U.S. Cl.
CPC .............. *F16D 3/2055* (2013.01); *C21D 1/18* (2013.01); *C21D 1/42* (2013.01); *C22C 38/002* (2013.01); *C22C 38/02* (2013.01); *C22C 38/04* (2013.01); *C22C 38/06* (2013.01); *C22C 38/22* (2013.01); *C22C 38/24* (2013.01); *C22C 38/32* (2013.01); *F16D 2200/0021* (2013.01); *Y02P 10/253* (2015.11)

(58) Field of Classification Search
CPC ....... C22C 38/00; C22C 38/002; C22C 38/02; C22C 38/04; C22C 38/06; C22C 38/12; C22C 38/22; C22C 38/24; C22C 38/32; C22C 38/60; C21D 1/06; C21D 1/18; C21D 1/42; C21D 9/32; C23C 8/00; C23C 8/22; C23C 8/46; C23C 8/66; F16D 3/205
See application file for complete search history.

(56) References Cited

U.S. PATENT DOCUMENTS

| 4,785,147 | A | * | 11/1988 | Mucha | ................. | C21D 9/32 219/640 |
| 2005/0039830 | A1 | * | 2/2005 | Christofis | ............... | C21D 1/10 148/575 |
| 2015/0041029 | A1 | * | 2/2015 | Yamashita | ............... | C21D 8/06 148/645 |

FOREIGN PATENT DOCUMENTS

| JP | 2001-187924 A | 7/2001 |
| JP | 2005-256897 A | 9/2005 |
| JP | 2007-303502 A | 11/2007 |
| JP | 2008-256082 A | 10/2008 |
| JP | 2009-057610 A | 3/2009 |
| JP | 2009-228049 A | 10/2009 |

(Continued)

*Primary Examiner* — Alexandra M Moore
(74) *Attorney, Agent, or Firm* — Mintz Levin Cohn Ferris Glovsky and Popeo, P.C.; Peter F. Corless

(57) ABSTRACT

Disclosed herein are a tripod joint spider, a method of manufacturing the same, and an alloy steel of the tripod joint spider. The method comprises producing a primary molded article using the alloy steel, producing a secondary molded article, hardening the secondary molded article by means of induction hardening, and producing an end product.

8 Claims, 3 Drawing Sheets

INDUCTION HARDENING

(56) References Cited

FOREIGN PATENT DOCUMENTS

| | | |
|---|---|---|
| JP | 2015-074791 A | 4/2015 |
| KR | 2010-0057332 A | 5/2010 |

\* cited by examiner

US 10,738,832 B2

TRIPOD JOINT SPIDER, METHOD OF MANUFACTURING THE SAME, AND ALLOY STEEL APPLIED THERETO

CROSS REFERENCE TO RELATED APPLICATION

The present application claims priority of Korean Patent Application No. 10-2016-0041191 filed on Apr. 4, 2016, the entire contents of which is incorporated herein for all purposes by this reference.

TECHNICAL FIELD

The present invention relates to a tripod joint spider, a method of manufacturing the same, and an alloy steel of the spider.

BACKGROUND

The tripod joint of a vehicle powertrain is a component which transfers rotary power from a transmission to a shaft connected to drive wheels.

In brief, an assembly of a spider 100 and rollers 20 is inserted into a housing 10, which is connected to a transmission and rotates along therewith, and a shaft 30 is inserted into the spider 100, so that rotary power is transferred from the transmission to drive wheels, as illustrated in FIG. 1.

As illustrated in FIGS. 1 and 2, the spider 100 has trunnions which protrude at regular intervals of 120 degrees, and after the rollers 20 are coupled to the respective trunnions, the assembly thereof is inserted and assembled in the housing 10.

In this case, the spider 100 may be made of chrome-nickel alloy steel, which may be carburized to harden the surface of the spider.

A conventional spider is made of alloy steel comprising, for example, 0.17 to 0.23 wt % of C, 0.15 to 0.35 wt % of Si, 0.55 to 0.90 wt % of Mn, 0.85 to 1.25 wt % of Cr, 0.15 to 0.35 wt % of Mo, 0.030 wt % or less of P, 0.030 wt % or less of S, and a balance of Fe.

When carburizing is performed on the spider made of such a material, the surface of the spider may be hardened to have a hardness of 600 Hv to provide improved durability of the spider.

However, since parts have been recently required to have a long life, there is an increasing need for an alloy steel specialized to manufacture a spider having extended life span compared to conventional spiders, and a manufacturing method capable of controlling the surface hardness and hardening depth thereof.

The foregoing is intended merely to aid in the understanding of the background of the present invention, and is not intended to mean that the present invention falls within the purview of the related art that is already known to those skilled in the art.

SUMMARY OF THE INVENTION

In preferred aspects, the present invention provides a tripod joint spider having an improved service life, a method of manufacturing the same, and an alloy steel used for the tripod joint spider.

In one aspect of the present invention, a method of manufacturing a spider inserted into a tripod joint for a vehicle may include: producing a round bar comprising an alloy steel, producing a primary molded article by forging the round bar, producing a secondary molded article by cutting the primary molded article, hardening the secondary molded article by means of induction hardening, and producing an end product by grinding the hardened secondary molded article.

In one preferred aspect, the alloy steel may comprise an amount of about 0.45 to 0.60 wt % of carbon (C), an amount of about 0.30 to 0.50 wt % of silicon (Si), an amount of about 0.8 to 1.3 wt % of manganese (Mn), an amount of about 0.40 to 0.80 wt % of chromium (Cr), an amount of about 0.40 to 0.90 wt % of molybdenum (Mo), an amount of about 0.01 to 0.10 wt % of vanadium (V), an amount of about 0.02 to 0.10 wt % of aluminum (Al), an amount of about 0.030 wt % or less but greater than 0 wt % of phosphorus (P), an amount of about 0.030 wt % or less but greater than 0% wt of sulfur (S), an amount of about 0.004 wt % or less but greater than 0 wt % of boron (B), and iron (Fe) constituting the remaining balance of the alloy steel, all the wt % based on the total weight of the alloy steel.

In the producing a round bar, the alloy steel may have a heat treatment index (HI) of about 16 to 20 defined by the following equation 1:

$$HI = 10.9 \times [C] - 1.1 \times [Si] + 6.7 \times [Mn] + 2.3 \times [Cr] + 7.9 \times [Mo] \qquad [\text{Equation 1}]$$

where each of [C], [Si], [Mn], [Cr], and [Mo] means wt % of the components corresponding thereto.

The term "heat treatment index" as used herein refers to a property of a metallic material against heat treatment. For example, the heat treatment index may indicate a sensitivity of heat treatment hardening of the metallic material. Thus, hardening depth of metallic material is altered by differential of heat treatment index in same heat treatment condition. Heat treatment index which particularly may vary based on the compositions thereof such as C, Si, Mn, Cr, and Mo.

The hardening the secondary molded article may include an external process to perform the induction hardening on an outer surface of the secondary molded article, and an internal process to perform the induction hardening on an inner surface of the secondary molded article. Preferably, the external process may perform the induction hardening at a power of about 300 to 400 W and a frequency of about 5 to 20 kHz for about 5 to 15 seconds, and the internal process may perform the induction hardening at a power of about 200 to 310 W and a frequency of about 10 to 30 kHz for about 2 to 10 seconds.

After the external process, the outer surface of the secondary molded article suitably may have a hardening depth of about 2.5 to 3.5 mm, and after the internal process, the inner surface of the secondary molded article suitably may have a hardening depth of about 1.0 to 2.0 mm.

Preferably, the outer surface of the secondary molded article after the external process may have a greater hardness than the inner surface thereof after the internal process. In addition, after hardening the second molded article (i.e. external process and internal process) the outer surface of the secondary molded article may have a hardness of about 550 Hv or greater, and the inner surface of the secondary molded article may have a hardness of about 530 Hv or greater.

Further provided is the alloy steel that may consist essentially of, consist essentially of, or consist of the components described herein. For example, the alloy steel may consist essentially of, consist essentially of, or consist of: an amount of about 0.45 to 0.60 wt % of carbon (C), an amount of about 0.30 to 0.50 wt % of silicon (Si), an amount of about 0.8 to 1.3 wt % of manganese (Mn), an amount of about 0.40 to 0.80 wt % of chromium (Cr), an amount of about 0.40 to 0.90 wt % of molybdenum (Mo), an amount of about 0.01 to 0.10 wt % of vanadium (V), an amount of about 0.02 to 0.10 wt % of aluminum (Al), an amount of about 0.030 wt % or less but greater than 0 wt % of phosphorus (P), an amount of about 0.030 wt % or less but greater than 0% wt of sulfur (S), an amount of about 0.004 wt % or less but greater than 0 wt % of boron (B), and iron (Fe) constituting the remaining balance of the alloy steel, all the wt % based on the total weight of the alloy steel.

In another aspect of the present invention, a spider inserted into a tripod joint for a vehicle may comprise an alloy steel. In one preferred aspect, the alloy steel may comprise: an amount of about 0.45 to 0.60 wt % of carbon (C), an amount of about 0.30 to 0.50 wt % of silicon (Si), an amount of about 0.8 to 1.3 wt % of manganese (Mn), an amount of about 0.40 to 0.80 wt % of chromium (Cr), an amount of about 0.40 to 0.90 wt % of molybdenum (Mo), an amount of about 0.01 to 0.10 wt % of vanadium (V), an amount of about 0.02 to 0.10 wt % of aluminum (Al), an amount of about 0.030 wt % or less but greater than 0 wt % of phosphorous (P), an amount of about 0.030 wt % or less but greater than 0 wt % of sulfur (S), an amount of about 0.004 wt % or less but greater than 0 wt % of boron (B), and iron (Fe) constituting the remaining balance of the alloy steel. Unless otherwise indicated herein, all the wt % are based on the total weight of the alloy composition.

Preferably, the alloy steel may have a heat treatment index (HI) of about 16 to 20 defined by the following equation 1:

$$HI=10.9\times[C]-1.1\times[Si]+6.7\times[Mn]+2.3\times[Cr]+7.9\times[Mo] \quad \text{[Equation 1]}$$

where each of [C], [Si], [Mn], [Cr], and [Mo] means wt % of the components corresponding thereto.

The spider may have a surface hardened by induction hardening of the methods described above. Preferably, an outer surface of the spider may have a greater hardness than an inner surface thereof.

The outer surface of the spider suitably may have a hardness of about 550 Hv or greater, and the inner surface of the spider suitably may have a hardness of about 530 Hv or greater.

The outer surface of the spider suitably may have a hardening depth of about 2.5 to 3.5 mm, and the inner surface of the spider suitably may have a hardening depth of about 1.0 to 2.0 mm.

The alloy steel that may consist essentially of, consist essentially of, or consist of the components described herein. For example, the alloy steel may consist essentially of, consist essentially of, or consist of: an amount of about 0.45 to 0.60 wt % of carbon (C), an amount of about 0.30 to 0.50 wt % of silicon (Si), an amount of about 0.8 to 1.3 wt % of manganese (Mn), an amount of about 0.40 to 0.80 wt % of chromium (Cr), an amount of about 0.40 to 0.90 wt % of molybdenum (Mo), an amount of about 0.01 to 0.10 wt % of vanadium (V), an amount of about 0.02 to 0.10 wt % of aluminum (Al), an amount of about 0.030 wt % or less but greater than 0 wt % of phosphorus (P), an amount of about 0.030 wt % or less but greater than 0% wt of sulfur (S), an amount of about 0.004 wt % or less but greater than 0 wt % of boron (B), and iron (Fe) constituting the remaining balance of the alloy steel, all the wt % based on the total weight of the alloy steel.

In a further aspect of the present invention, an alloy steel used for a spider inserted into a tripod joint for a vehicle may comprise an amount of about 0.45 to 0.60 wt % of carbon (C), an amount of about 0.30 to 0.50 wt % of silicon (Si), an amount of about 0.8 to 1.3 wt % of manganese (Mn), an amount of about 0.40 to 0.80 wt % of chromium (Cr), an amount of about 0.40 to 0.90 wt % of molybdenum (Mo), an amount of about 0.01 to 0.10 wt % of vanadium (V), an amount of about 0.02 to 0.10 wt % of aluminum (Al), an amount of about 0.030 wt % or less but greater than 0 wt % of phosphorus (P), an amount of about 0.030 wt % or less but greater than 0% wt of sulfur (S), an amount of about 0.004 wt % or less but greater than 0 wt % of boron (B), and iron (Fe) constituting the remaining balance of the alloy steel. All the wt % are based on the total weight of the alloy steel.

Preferably, the alloy steel may have a heat treatment index (HI) of about 16 to 20 defined by the following equation 1:

$$HI=10.9\times[C]-1.1\times[Si]+6.7\times[Mn]+2.3\times[Cr]+7.9\times[Mo] \quad \text{[Equation 1]}$$

where each of [C], [Si], [Mn], [Cr], and [Mo] means wt % of the components corresponding thereto.

Further provided is the alloy steel that may consist essentially of, consist essentially of, or consist of the components described herein. For example, the alloy steel may consist essentially of, consist essentially of, or consist of: an amount of about 0.45 to 0.60 wt % of carbon (C), an amount of about 0.30 to 0.50 wt % of silicon (Si), an amount of about 0.8 to 1.3 wt % of manganese (Mn), an amount of about 0.40 to 0.80 wt % of chromium (Cr), an amount of about 0.40 to 0.90 wt % of molybdenum (Mo), an amount of about 0.01 to 0.10 wt % of vanadium (V), an amount of about 0.02 to 0.10 wt % of aluminum (Al), an amount of about 0.030 wt % or less but greater than 0 wt % of phosphorus (P), an amount of about 0.030 wt % or less but greater than 0% wt of sulfur (S), an amount of about 0.004 wt % or less but greater than 0 wt % of boron (B), and iron (Fe) constituting the remaining balance of the alloy steel, all the wt % based on the total weight of the alloy steel.

Further provided is a vehicle that may comprise a spider as described herein.

As apparent from the above description, the tripod joint spider, the method of manufacturing the same, and the alloy steel used for the tripod joint spider according to exemplary embodiments of the present invention may provide the following effects.

First, the spider may have an extended service life due to increased stiffness thereof.

Secondly, the damage of the spider may be suppressed when an external impact is applied thereto by increasing the hardening depth thereof.

Thirdly, since the outer and inner surfaces of the spider are differentially treated with heat, stiffness required at each corresponding position may be obtained.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
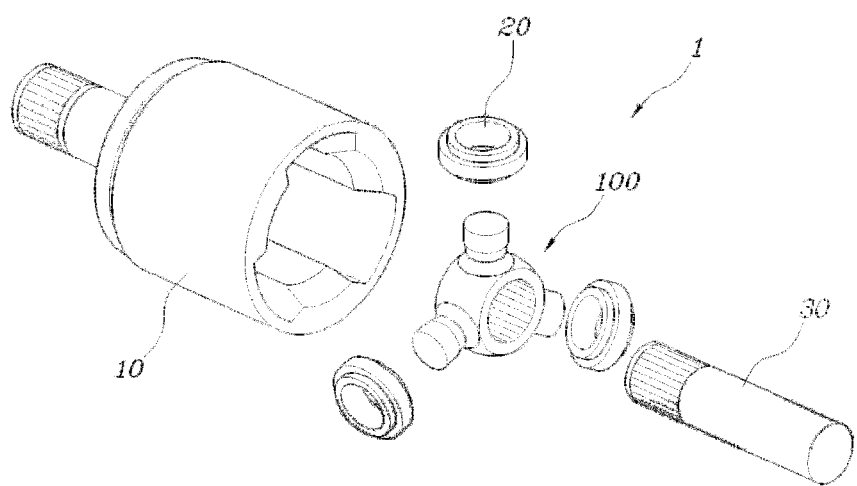
FIG. 1 shows an exploded perspective view illustrating a typical tripod joint in the related art.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises/comprising" or "includes/including" when used herein, specify the presence of stated features, regions, integers, steps, operations, elements, and/or components, but do not preclude the presence or addition of one or more other features, regions, integers, steps, operations, elements, components, and/or groups thereof.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

A tripod joint spider, a method of manufacturing the same, and an alloy steel applied thereto according to various exemplary embodiments of the present invention will be described below with reference to the accompanying drawings.

First, a method of manufacturing a spider inserted into a tripod joint for a vehicle will be described.

The method may include a step of producing a round bar, a step of producing a primary molded article, a step of producing a secondary molded article, a hardening step, and a step of producing an end product.

The material used in the step of producing a round bar will be described later together with the description of alloy steel for a tripod joint, and description thereof will be omitted herein.

The round bar may be processed to form the basic shape of a spider by forging in the step of producing a primary molded article. The secondary molded article may be processed to form the detailed shape of the spider by cutting in the step of producing a secondary molded article.

The spider produced in such a way may have the structure described in the background, and may have an inner surface portion which is formed at the center thereof for insertion of a shaft, and an outer surface portion which comes into contact with a housing.

In the hardening step, the secondary molded article may be induction-hardened in order to control the hardening depth and hardness thereof. Preferably, the secondary molded article may be processed through induction hardening rather than carburizing since the induction hardening may be easy to control the quantity of heat applied to the secondary molded article and the heating position thereof.

In the step of producing an end product, the spider applied to the tripod joint may be finally manufactured by removing burrs formed in the hardening step from the secondary molded article or grinding a portion of the secondary molded article where friction may occur.

The hardening step may include an external process which performs heat treatment on the outer surface of the secondary molded article, and an internal process which performs heat treatment on the inner surface of the secondary molded article.

The external process and internal process may be simultaneously performed. Alternatively, one of them may be first performed and the other process may be then performed.

The external process may be a heat treatment on the outer surface of the secondary molded article at a power of about 300 to 400 W and a frequency of about 5 to 20 kHz for about 5 to 15 seconds, so that the outer surface of the secondary molded article may have a hardening depth of about 2.5 to 3.5 mm and a hardness of about 550 Hv or greater.

The internal process may be a heat treatment on the inner surface of the secondary molded article at a power of about 200 to 310 W and a frequency of about 10 to 30 kHz for about 2 to 10 seconds, so that the inner surface of the secondary molded article may have a hardening depth of about 1.0 to 2.0 mm and a hardness of about 530 Hv or greater.

Preferably, the condition of induction hardening may be controlled such that the outer surface of the secondary molded article may have a greater hardness than the inner surface thereof. The surface of the spider must have hardness and stiffness over a certain level in order to increase the reliability and life thereof. Therefore, the outer surface of the spider where considerable friction occurs may be formed to have a greater stiffness than the inner surface thereof, thereby enabling the spider to normally function without abrasion even under severe friction environments.

In this case, when the voltage and heating time required to perform the induction hardening are less than the predetermined range as described above, the surface hardness of the spider may be reduced and the durability thereof may be deteriorated. On the contrary, when the voltage and heating time required to perform the induction hardening is greater than the predetermined range as described above, the stiffness of the spider may be reduced due to grain growth by overheating.

In addition, when the frequency required to perform the induction hardening is greater than the predetermined range as described above, the stiffness of the spider may be reduced due to the low hardening depth thereof and the durability thereof may be deteriorated. On the contrary, when the frequency required to perform the induction hardening is less than the predetermined range as described above, the stiffness of the spider may be increased due to the excessive hardening depth thereof and the brittleness of the spider may be significantly increased. Consequently, the spider may be vulnerable to external impacts.

Next, the alloy steel applied to the tripod joint spider according to the embodiment of the present invention will be described.

The composition of the alloy steel may comprise an amount of about 0.45 to 0.60 wt % of C, an amount of about 0.30 to 0.50 wt % of Si, an amount of about 0.8 to 1.3 wt % of Mn, an amount of about 0.40 to 0.80 wt % of Cr, an amount of about 0.40 to 0.90 wt % of Mo, an amount of about 0.01 to 0.10 wt % of V, an amount of about 0.02 to 0.10 wt % of Al, an amount of about 0.030 wt % or less but greater than 0 wt % of P, an amount of about 0.030 wt % or less but greater than 0 wt % of S, an amount of about 0.004 wt % or less but greater than 0 wt % of B, and Fe constituting the remaining balance of the composition, and all the wt % are based on the total weight of the composition. The alloy steel suitably may have a heat treatment index (HI) of about 16 to 20 defined by the following equation 1:

$$HI=10.9\times[C]-1.1\times[Si]+6.7\times[Mn]+2.3\times[Cr]+7.9\times[Mo]$$ [Equation 1]

where each of [C], [Si], [Mn], [Cr], and [Mo] means wt % of the components as described herein. Hereinafter, the numerical limitation of the composition will be described.

(1) Carbon (C) in an Amount of about 0.45 to 0.60 wt %

The carbon (C) as used herein may be an additive element to improve stiffness. The more the amount of addition of the carbon is increased, the more the stiffness of the steel may be increased. However, when the amount of addition of the carbon is greater than the predetermined amount, for example, greater than about 0.60 wt %, the toughness and machinability of the steel may be deteriorated.

In order for the steel to have stiffness enough to be applied to the tripod joint spider, the alloy steel may comprise add 0.45 wt % or greater amount of C. When the amount of addition of the carbon is greater than about 0.60 wt %, the stiffness of the steel may be substantially excessively improved and a process such as cutting the spider may be difficult. Therefore, the content of the carbon may be preferably limited to the above range.

(2) Silicon (Si) in an Amount of about 0.30 to 0.50 wt %

The silicon (Si) as used herein may be an additive element to suppress generation of carbide. The effect may be obtained by adding an amount of about 0.30 wt % or greater of Si to the steel. However, when the amount of addition of the silicon is greater than about 0.50 wt %, the segregation of SiC may be generated. Therefore, the content of the silicon may be preferably limited to the above range.

(3) Manganese (Mn) in an Amount of about 0.8 to 1.3 wt %

The manganese (Mn) as used herein may be an additive element to improve stiffness, similarly to carbon and molybdenum. The more the content of the manganese is increased, the more the stiffness of the steel may be increased. However, when the amount of addition of the manganese is greater than the predetermined amount, for example, greater than about 1.3 wt %, the toughness and machinability of the steel may be deteriorated.

Therefore, the content of the manganese may be preferably limited to the above range in order to maintain the stiffness and processibility of the steel.

(4) Chromium (Cr) in an Amount of about 0.40 to 0.80 wt %

The chromium (Cr) as used herein may be an element serving to improve corrosion resistance and stiffness. When the amount of addition of the chromium is about 0.40 wt % or greater, physical properties, particularly stiffness required for the tripod joint spider may be improved.

However, when the amount of addition of the chromium is greater than about 0.80 wt %, the stiffness of the steel may be insignificantly improved and may not be sufficient to improve the service life of the part. Therefore, the content of the chromium may be preferably limited to the above range in order to reduce costs by limiting the content of the chromium which is relatively expensive.

(5) Molybdenum (Mo) in an Amount of about 0.40 to 0.90 wt %

The molybdenum (Mo) as used herein may be an element having an excellent effect of improving stiffness, similarly to carbon. The effect may be obtained by adding an amount of about 0.40 wt % or greater of Mo to the steel.

However, when the amount of addition of the molybdenum is greater than about 0.90 wt %, the brittleness of the steel may be increased due to a reduction in roughness according to an increase in stiffness. Therefore, the content of the molybdenum may be preferably limited to the above range.

(6) Vanadium (V) in an Amount of about 0.01 to 0.10 wt %

The vanadium (V) as used herein may be an element having an excellent effect of refining grains. When the amount of addition of the vanadium is about 0.01 wt % or greater, the stiffness and toughness of the steel may be simultaneously improved.

However, when the amount of addition of the vanadium is greater than about 0.10 wt %, the durability of the steel may be deteriorated due to extraction of rough precipitates. Therefore, the content of the vanadium may be preferably limited to the above range.

(7) Aluminum (Al) in an Amount of about 0.02 to 0.10 wt %

The aluminum (Al) as used herein may be an element which affects grain refinement together with vanadium. The stiffness and toughness of the steel may be improved by adding an amount of about 0.02 wt % or greater of Al thereto. However, the amount of addition of the aluminum is greater than about 0.10 wt %, an inclusion such as alumina may be formed. Therefore, the content of the aluminum may be preferably limited to the above range.

(8) Boron (B) in an Amount of about 0.004 wt % or Less but Greater than 0 wt %

The boron (B) as used herein may be an element which helps hardening by heat treatment, and may be added to increase quenching properties. The effect may be obtained by adding an effective amount of boron to the steel. However, when the amount of addition of the boron is greater than about 0.004 wt %, the durability of the steel may be significantly deteriorated due to generation of segregation. Therefore, the content of the boron may be preferably limited to the above range.

(9) Phosphorus (P) and Sulfur (S:) in an Amount of about 0.030 wt % or Less but Greater than 0 wt %

The phosphorus (P) and sulfur (S) may be impurities which are unavoidably included in the steel. When the amount of addition of the phosphorus and sulfur is increased, inclusions may be formed. Therefore, the content of each phosphorus and sulfur may be limited to 0.030 wt % or less.

Equation 1 may define a heat treatment index (HI) of material. The index is proportional to the contents of carbon, manganese, chromium, and molybdenum, and is inversely proportional to the content of silicon. When the index in equation 1 is less than about 16, the stiffness of the spider may be reduced due to the low hardening depth thereof. On the contrary, when the index is greater than about 20, the brittleness of the spider may be increased due to the excessive hardening depth thereof. Therefore, the heat treatment index (HI) of material in equation 1 may be preferably of about 16 to 20.

EXAMPLE

Hereinafter, (material/composition) according to an exemplary embodiment of the present invention will be described with reference to the accompanying drawings.

The compositions of steel as the material of the spider according to an example of the present invention and comparative examples are indicated by the following Table 1.

TABLE 1

| | C (wt %) | Si (wt %) | Mn (wt %) | Cr (wt %) | Mo (wt %) | V (wt %) | Al (wt %) | B (wt %) | P (wt %) | S (wt %) | HI |
|---|---|---|---|---|---|---|---|---|---|---|---|
| Conventional steel | 0.21 | 0.24 | 0.75 | 0.99 | 0.23 | — | — | — | — | — | — |
| Example | 0.52 | 0.41 | 1 | 0.6 | 0.6 | 0.06 | 0.05 | 0.002 | 0.005 | 0.004 | 18 |
| Comparative Example 1 | 0.56 | 0.4 | 1.15 | 0.6 | 0.65 | — | — | — | 0.005 | 0.004 | 19.9 |
| Comparative Example 2 | 0.48 | 0.45 | 0.9 | 0.45 | 0.45 | 0.06 | 0.05 | 0.002 | 0.005 | 0.004 | 15.4 |
| Comparative Example 3 | 0.54 | 0.41 | 1.2 | 0.7 | 0.75 | 0.06 | 0.05 | 0.002 | 0.005 | 0.004 | 21 |
| Comparative Example 4 | 0.52 | 0.41 | 1 | 0.6 | 0.6 | — | 0.05 | 0.002 | 0.005 | 0.004 | 18 |
| Comparative Example 5 | 0.48 | 0.30 | 0.7 | 0.5 | 0.3 | 0.06 | 0.05 | 0.002 | 0.005 | 0.004 | 13.1 |
| Comparative Example 6 | 0.54 | 0.41 | 1.5 | 0.7 | 1.0 | 0.06 | 0.05 | 0.002 | 0.005 | 0.004 | 25.0 |
| Comparative Example 7 | 0.65 | 0.41 | 1.2 | 0.7 | 0.75 | 0.06 | 0.05 | 0.002 | 0.005 | 0.004 | 22.2 |

In addition, the measurement results of the surface hardness, hardening depth, fatigue life of steel (spider) according to an example of the present invention and comparative examples are indicated by the following Table 2.

TABLE 2

| | Heat treatment result | | | |
|---|---|---|---|---|
| Sort | Surface hardness (Hv) | Hardening depth (mm) | Evaluation result Fatigue life (ten thousand cycles) | Note |
| Conventional steel | 650 | 0.8 | 30 | |
| Example | Outer) 608 Inner) 560 | 3.2 1.6 | 48 | OK |
| Comparative Example 1 | Outer) 630 Inner) 575 | 3.4 2.0 | 34 | NG |
| Comparative Example 2 | Outer) 600 Inner) 550 | 2.3 0.9 | 26 | NG |
| Comparative Example 3 | Outer) 677 Inner) 593 | 4.2 2.5 | 33 | NG |
| Comparative Example 4 | Outer) 608 Inner) 560 | 3.2 1.6 | 38 | NG |
| Comparative Example 5 | Outer) 595 Inner) 548 | 2.1 0.8 | 22 | NG |
| Comparative Example 6 | Outer) 690 Inner) 605 | 4.4 2.6 | 34 | NG |
| Comparative Example 7 | Outer) 706 Inner) 609 | 4.6 2.7 | 26 | NG |

As indicated in Tables 1 and 2, when the composition and HI ranged in the scope of the present invention, the steel (spider) had high durability since it had a fatigue life of 400 thousand cycles or greater in the torsional rigidity test.

On the contrary, when the composition and HI ranged out of the scope of the present invention, the steel had a fatigue life less than 400 thousand cycles in the torsional rigidity test.

The comparative examples will be described in more detail. Since V, Al, and B were not added to the steel in the comparative example 1, grain refinement was insufficient. For this reason, the overall stiffness of the steel was reduced and the fatigue life thereof was thus reduced.

In the Comparative Examples 2 and 3, the composition of the present invention was satisfied, but the heat treatment index (HI) was less or greater than the range of the present invention. Therefore, the hardening depth of the spider was less and the stiffness and hardness thereof were thus reduced in the Comparative Example 2. In addition, the brittleness of the spider was increased due to the high hardening depth thereof, and the fatigue life there of the spider was thus reduced in the Comparative Example 3.

In the Comparative Example 4, the composition and heat treatment index (HI) of the present invention were satisfied, but V was not added to the steel. For this reason, grain refinement was insufficient and the fatigue life of the steel was less than the predetermined range.

In the Comparative Examples 5 and 6, the contents of Mn and Mo were less or greater than the range of the present invention. For this reason, the heat treatment index (HI) was beyond the range of the present invention and the fatigue life of the spider was reduced due to the low hardening depth (Comparative Example 5) thereof or the high hardening depth (Comparative Example 6) thereof.

The content of C was greater than the range of the present invention in the Comparative Example 7, and thus the heat treatment index (HI) was greater than the range of the present invention. For this reason, the brittleness of the spider was increased due to the high hardening depth thereof, and the fatigue life thereof was thus reduced.

Figure 2:
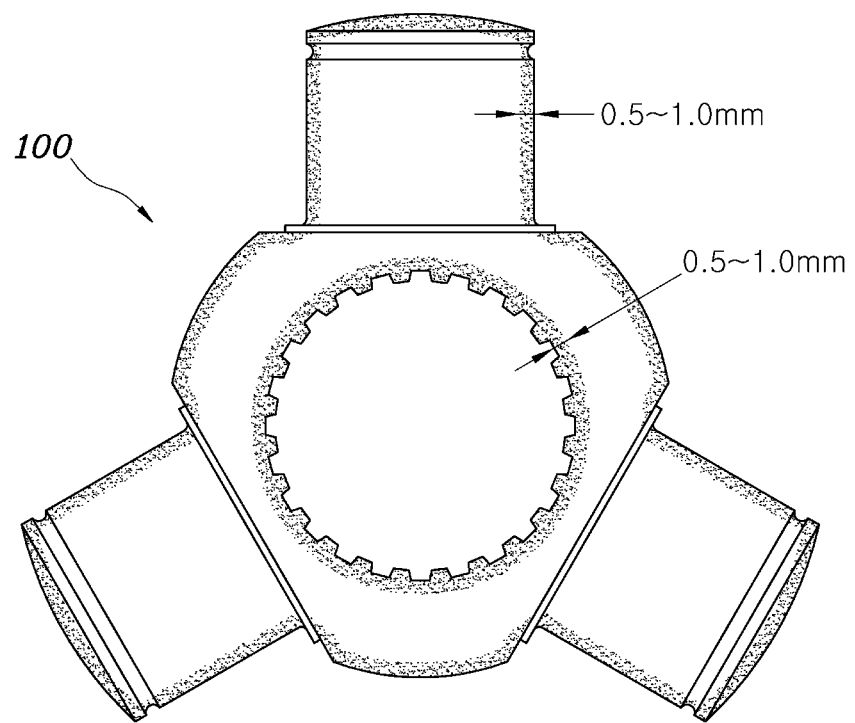
FIG. 2 illustrates a hardening depth of a conventional spider when it undergoes carburizing in the related art.
Figure 3:
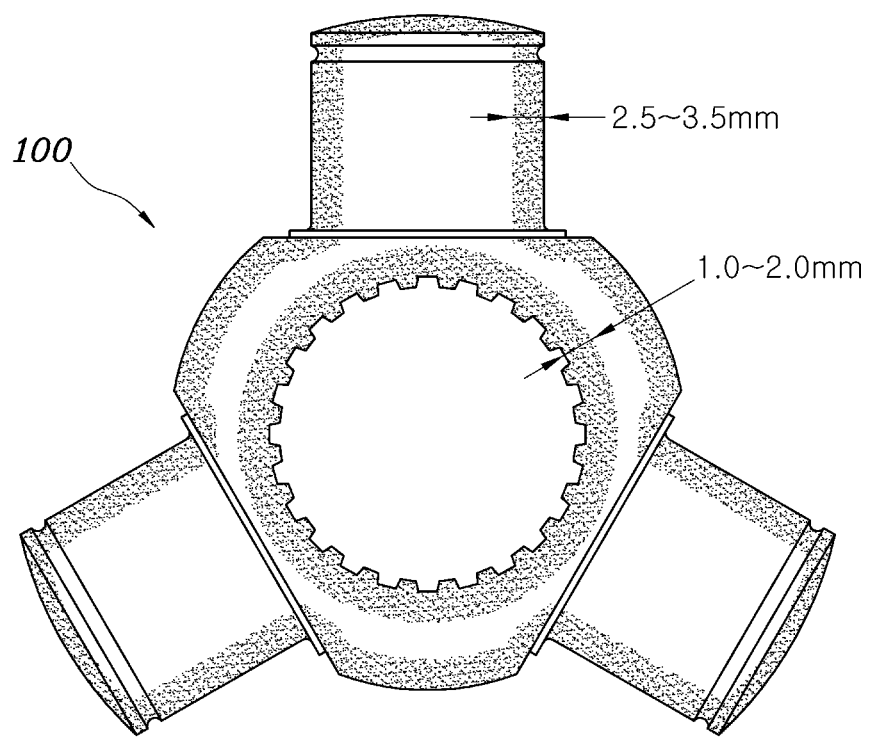
FIG. 3 is illustrates an exemplary hardening depth of a spider when it undergoes induction hardening according to an embodiment of the present invention.

FIG. 2 illustrates the hardening depth of the conventional spider when it undergoes carburizing. FIG. 3 illustrates the hardening depth of the spider when it undergoes induction hardening according to an exemplary embodiment of the present invention.

The conventional carburizing may be constantly performed regardless of the inner and outer surfaces of the spider. However, since the induction hardening according to an exemplary embodiment of the present invention is differentially performed on the spider according to the position thereof, the necessary portion of the spider may be heated by an amount required therefor.

In other words, less quantity of heat may be applied to the inner surface of the spider, which requires less stiffness than the outer surface thereof, in order to reduce the hardening depth and the hardness of the inner surface. Consequently, energy from being unnecessarily consumed may be prevented and the processing time of the spider may be reduced.

Meanwhile, since the characteristics of the spider inserted into the tripod joint for the vehicle are given in the above description of the manufacturing method and the alloy steel, detailed description thereof is omitted herein.

It will be understood that the above-mentioned technical configurations of various exemplary embodiments may be executed in order to enable those of ordinary skill in the art to embody and practice the invention in other specific forms without changing the spirit or essential features of the invention.

Although the various embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A spider inserted into a tripod joint for a vehicle, the spider comprising an alloy steel,
    wherein the alloy steel comprises an amount of about 0.45 to 0.60 wt % of carbon (C), an amount of about 0.30 to 0.50 wt % of Si, an amount of about 0.8 to 1.3 wt % of Mn, an amount of about 0.40 to 0.80 wt % of Cr, an amount of about 0.40 to 0.90 wt % of Mo, an amount of about 0.01 to 0.10 wt % of V, an amount of about 0.02 to 0.10 wt % of aluminum (Al), an amount of about 0.030 wt % or less but greater than 0 wt % of phosphorus (P), an amount of about 0.030 wt % or less but greater than 0 wt % of sulfur (S), an amount of about 0.004 wt % or less but greater than 0 wt % of boron (B), and iron (Fe) constituting the remaining balance of the alloy steel, all the wt % based on the total weight of the alloy steel, and
    the alloy steel has a heat treatment index (HI) of about 16 to 20 defined by the following equation 1:

$$HI=10.9\times[C]-1.1\times[Si]+6.7\times[Mn]+2.3\times[Cr]+7.9\times[Mo] \quad \text{[Equation 1]}$$

wherein each of [C], [Si], [Mn], [Cr], and [Mo] means wt % of the components corresponding thereto,
    wherein an outer surface of the spider has a greater hardness than an inner surface of the spider,
    wherein the outer surface of the spider has a hardness of about 550 Hv or greater, and the inner surface of the spider has a hardness of about 530 Hv or greater;
    wherein the outer surface of the spider has a hardening depth of about 2.5 to 3.5 mm, and the inner surface of the spider has a hardening depth of about 1.0 to 2.0 mm;
    wherein the spider has a fatigue life of 400 thousand cycles or greater in a torsional rigidity test.

2. The spider according to claim 1, wherein the spider has a surface hardened by induction hardening.

3. The spider according to claim 1, wherein the alloy steel consists essentially of an amount of about 0.45 to 0.60 wt % of carbon (C), an amount of about 0.30 to 0.50 wt % of silicon (Si), an amount of about 0.8 to 1.3 wt % of manganese (Mn), an amount of about 0.40 to 0.80 wt % of chromium (Cr), an amount of about 0.40 to 0.90 wt % of molybdenum (Mo), an amount of about 0.01 to 0.10 wt % of vanadium (V), an amount of about 0.02 to 0.10 wt % of aluminum (Al), an amount of about 0.030 wt % or less but greater than 0 wt % of phosphorus (P), an amount of about 0.030 wt % or less but greater than 0% wt of sulfur (S), an amount of about 0.004 wt % or less but greater than 0 wt % of boron (B), and iron (Fe) constituting the remaining balance of the alloy steel, all the wt % based on the total weight of the alloy steel.

4. The spider according to claim 1, wherein the alloy steel consists of an amount of about 0.45 to 0.60 wt % of carbon (C), an amount of about 0.30 to 0.50 wt % of silicon (Si), an amount of about 0.8 to 1.3 wt % of manganese (Mn), an amount of about 0.40 to 0.80 wt % of chromium (Cr), an amount of about 0.40 to 0.90 wt % of molybdenum (Mo), an amount of about 0.01 to 0.10 wt % of vanadium (V), an amount of about 0.02 to 0.10 wt % of aluminum (Al), an amount of about 0.030 wt % or less but greater than 0 wt % of phosphorus (P), an amount of about 0.030 wt % or less but greater than 0% wt of sulfur (S), an amount of about 0.004 wt % or less but greater than 0 wt % of boron (B), and iron (Fe) constituting the remaining balance of the alloy steel, all the wt % based on the total weight of the alloy steel.

5. An alloy steel applied to a spider inserted into a tripod joint for a vehicle, the alloy steel comprising:
    an amount of about 0.45 to 0.60 wt % of carbon (C), an amount of about 0.30 to 0.50 wt % of silicon (Si), an amount of about 0.8 to 1.3 wt % of manganese (Mn), an amount of about 0.40 to 0.80 wt % of chromium (Cr), an amount of about 0.40 to 0.90 wt % of molybdenum (Mo), an amount of about 0.01 to 0.10 wt % of vanadium (V), an amount of about 0.02 to 0.10 wt % of aluminum (Al), an amount of about 0.030 wt % or less but greater than 0 wt % of phosphorus (P), an amount of about 0.030 wt % or less but greater than 0 wt % of sulfur (S), an amount of about 0.004 wt % or less but greater than 0 wt % of boron (B), and iron (Fe) constituting the remaining balance of the alloy steel, all the wt % based on the total weight of the alloy steel,
    wherein the alloy steel has a heat treatment index (HI) of about 16 to 20 defined by the following equation 1:

$$HI=10.9\times[C]-1.1\times[Si]+6.7\times[Mn]+2.3\times[Cr]+7.9\times[Mo] \quad \text{[Equation 1]}$$

wherein an outer surface of the spider has a greater hardness than an inner surface of the spider,
    wherein the outer surface of the spider has a hardness of about 550 Hv or greater, and the inner surface of the spider has a hardness of about 530 Hv or greater;
    wherein the outer surface of the spider has a hardening depth of about 2.5 to 3.5 mm, and the inner surface of the spider has a hardening depth of about 1.0 to 2.0 mm;
    where each of [C], [Si], [Mn], [Cr], and [Mo] means wt % of the components corresponding thereto,
    wherein the spider has a fatigue life of 400 thousand cycles or greater in a torsional rigidity test.

6. The alloy steel according to claim 5, wherein the alloy steel consists essentially of an amount of about 0.45 to 0.60 wt % of carbon (C), an amount of about 0.30 to 0.50 wt % of silicon (Si), an amount of about 0.8 to 1.3 wt % of manganese (Mn), an amount of about 0.40 to 0.80 wt % of chromium (Cr), an amount of about 0.40 to 0.90 wt % of molybdenum (Mo), an amount of about 0.01 to 0.10 wt % of vanadium (V), an amount of about 0.02 to 0.10 wt % of aluminum (Al), an amount of about 0.030 wt % or less but greater than 0 wt % of phosphorus (P), an amount of about 0.030 wt % or less but greater than 0% wt of sulfur (S), an amount of about 0.004 wt % or less but greater than 0 wt % of boron (B), and iron (Fe) constituting the remaining balance of the alloy steel, all the wt % based on the total weight of the alloy steel.

7. The alloy steel according to claim 6, wherein the alloy steel consists of an amount of about 0.45 to 0.60 wt % of carbon (C), an amount of about 0.30 to 0.50 wt % of silicon (Si), an amount of about 0.8 to 1.3 wt % of manganese (Mn), an amount of about 0.40 to 0.80 wt % of chromium (Cr), an amount of about 0.40 to 0.90 wt % of molybdenum (Mo), an amount of about 0.01 to 0.10 wt % of vanadium (V), an amount of about 0.02 to 0.10 wt % of aluminum (Al), an amount of about 0.030 wt % or less but greater than 0 wt % of phosphorus (P), an amount of about 0.030 wt % or less but greater than 0% wt of sulfur (S), an amount of about 0.004 wt % or less but greater than 0 wt % of boron (B), and iron (Fe) constituting the remaining balance of the alloy steel, all the wt % based on the total weight of the alloy steel.

8. A vehicle that comprises a spider of claim 1.

* * * * *